(12) United States Patent
Deguchi et al.

(10) Patent No.: US 7,885,041 B2
(45) Date of Patent: Feb. 8, 2011

(54) ROTATIONAL DISC TYPE STORAGE DEVICE

(75) Inventors: Takaaki Deguchi, Kanagawa (JP);
Hirofumi Nozaki, Kanagawa (JP);
Hiroshi Matsuda, Kanagawa (JP)

(73) Assignee: **Hitachi Global Storage Technologies,
Netherlands, B.V.**, Amsterdam (NL)

( * ) Notice: Subject to any disclaimer, the term of this patent is extended or adjusted under 35 U.S.C. 154(b) by 870 days.

(21) Appl. No.: 11/825,459

(22) Filed: Jul. 6, 2007

(65) Prior Publication Data

US 2008/0019051 A1   Jan. 24, 2008

(30) Foreign Application Priority Data

Jul. 7, 2006   (JP)   ............... 2006-187901

(51) Int. Cl.
*G11B 21/08*   (2006.01)
(52) U.S. Cl. .................................. 360/265.2
(58) Field of Classification Search ............. 360/265.2, 360/265.3, 265.4, 265.5, 265.6
See application file for complete search history.

(56) References Cited

U.S. PATENT DOCUMENTS 6,205,004 B1 *  3/2001  Kim ...................... 360/264.1
6,924,962 B2 *  8/2005  Jeong .................... 360/265.6
6,940,699 B2 *  9/2005  Yuki et al. .............. 360/265.2
6,963,473 B2 * 11/2005  Honda et al. ........... 360/294.7
7,023,666 B2 *  4/2006  Ramsdell ................ 360/265.2
7,088,557 B2 *  8/2006  Miyamoto et al. ....... 360/265.2

FOREIGN PATENT DOCUMENTS

| JP | 08-203224 | 8/1996 |
| JP | 10-302421 | 11/1998 |
| JP | 2000-132926 | 5/2000 |
| JP | 2002251845 | * 9/2002 |

\* cited by examiner

*Primary Examiner*—Angel A. Castro (57) ABSTRACT

Embodiments of the present invention help to stabilize a tilt amount of a head gimbal assembly with respect to a magnetic disc. According to one embodiment of the present invention, in a head stack assembly in which a head gimbal assembly, a carriage, and a head gimbal assembly are stacked and fixed by a pivot cartridge, a spring washer and a nut, an annular recess portion having a length in the radial direction of a flange is formed on a contact face of the flange formed at one end of the cartridge, so that two places of a mount plate of the head gimbal assembly may be partially supported in the radial direction of the flange.

9 Claims, 7 Drawing Sheets

ROTATIONAL DISC TYPE STORAGE DEVICE

CROSS-REFERENCE TO RELATED APPLICATION

The instant nonprovisional patent application claims priority to Japanese Patent Application No. 2006-187901 filed Jul. 7, 2006 and which is incorporated by reference in its entirety herein for all purposes.

BACKGROUND OF THE INVENTION

A magnetic disk device as a rotational disc type storage device is used as a data storage device for a personal computer, a server or the like.

This magnetic disk device includes a disc type magnetic disk that is equipped with a recording face having a magnetic layer formed on the surface thereof and provided rotatably around a spindle shaft, a head stack assembly and a control unit for controlling reading/writing of data from/into a magnetic disk and the operation of the head stack assembly.

The head stack assembly is constructed by a head gimbal assembly, a carriage and a pivot cartridge. In the head gimbal assembly, a suspension load beam is fixed to a mount plate to be mounted on a carriage. The suspension load beam has a magnetic head for reading/writing data with the magnetic disk, and a slider for supplying an air bearing surface (ABS) to which a magnetic head is fixed. A coil support is formed at a part of the carriage, and the coil support holds a voice coil. The coil support is disposed in a magnetic field generated by a voice coil magnet and a voice coil yoke, and the voice coil magnet, the voice coil yoke and the voice coil comprise a voice coil motor (VCM) for generating driving force for rotating the carriage. The pivot cartridge is engagedly fitted in openings provided to the mount plate of the head gimbal assembly and the carriage to laminate the head gimbal assembly and the carriage. The laminated head gimbal assembly and carriage are fixedly pinched by a flange and a nut and fixed to the pivot cartridge. The head stack assembly thus constructed may be rotated around the pivot shaft.

When the magnetic disk is rotated, air flow at the surface forms an air bearing and applies buoyant force to the air bearing surface of the slider, so that the slider is slightly floated from the surface of the magnetic disk. By the driving force of the voice coil motor, the slider is turned around the center of the pivot shaft substantially in the radial direction of the magnetic disk under the state that the slider is slightly floated from the surface of the magnetic disk, whereby the magnetic head may read/write data at a predetermined position of the surface of the disk.

Such a magnetic disk device has been recently used for information electric household appliances and electrical equipment such as a notebook-size personal computer, a portable media player, a portable music player, a digital video camera or the like. In connection with advances in technology, hard disks used as data storage media of magnetic disk devices contained in information electric household appliances and electrical equipment, the magnetic disks are increased in data recording density and also microminiaturized. The promotion of the miniaturization of the magnetic disks performs developments of 2.5 type (2.5 inches (about 6.35 cm) type), and further 1 type (1 inch (about 2.54 cm) type). In the microminiaturized magnetic disk device, dimensional tolerance of the constituent devices are more remarkably small as compared with the conventional devices, and thus the processing precision and the mounting precision have been required to be more rigorously maintained. As an example, a magnetic disk and a head stack assembly are coupled to the base of a disk enclosure as different constituent devices. A slider coupled to a head gimbal assembly is designed so as to be floated from the recording surface of the magnetic disc by a fixed height under operation. Accordingly, the height of the head gimbal assembly with respect to the height of the recording surface of the magnetic disc under the assembly state must be converged within the range of the tolerance. Therefore, it is necessary that the magnetic disc is coupled to the base with high precision and also the head gimbal assembly is fixed to a pivot cartridge while rigorously keeping parallelism.

As such, a magnetic disk device has been proposed with an arcuate contact portion projecting toward a mount plate (arm) to be pinched between a flange and a nut (for example, see Japanese Patent Publication No. 8-203224 "Patent Document 1"). This contact portion is designed in an annular shape having a length in the radial direction of the flange and the nut. According to this magnetic disk device, the respective contact portions of the flange and the nut may keep the linear contact state to the mount plate (arm), and thus the parallelism of each contact face of the flange and the nut may reduce the influence on the mount plate (arm).

However, in conventional magnetic disk devices, the contact portion may be provided at only one place in cross-section in the radial direction of the flange and the nut, and thus the mount plate may be tilted along the shape of the contact portion. The reason why the mount plate is tilted along the shape of the contact portion as described above resides in that the end face of the opening of the mount plate is not supported at the contact portion. When the tilt direction of the mount plate is a separating direction from the magnetic disk, there may be considered a method of absorbing the tilt of the mount plate by adjusting the thickness of the flange or the carriage and approaching only the height position of the tip of the head gimbal assembly to a nominal value. However, according to this method, the clearance between the mount plate and the magnetic disk is reduced to a smaller value as it is nearer to the lamination portion of the mount plate with the flange and the carriage, and thus they interfere with each other with a high probability. Accordingly, it is very difficult to reduce the displacement of the height position by this method.

Furthermore, in order to prevent a situation that the pivot cartridge (hub) cannot be inserted into the opening due to production tolerance, a gap is provided between the pivot cartridge and the opening, and thus there is a case that the position of the mount plate supported at the contact portion is displaced within the range of the gap. When the position of the mount plate is displaced as described above, the height position of the head gimbal assembly is displaced.

BRIEF SUMMARY OF THE INVENTION

Embodiments in accordance with the present invention stabilize a tilt amount of a head gimbal assembly with respect to a magnetic disk. According to the particular embodiment disclosed in FIG. 1, in a head stack assembly 4 in which a head gimbal assembly, a carriage, and a head gimbal assembly are stacked and fixed by a pivot cartridge, a spring washer and a nut, an annular recess portion having a length in the radial direction of a flange is formed on a contact face of the flange formed at one end of the cartridge so that two places of a mount plate of the head gimbal assembly may be partially supported in the radial direction of the flange.

DETAILED DESCRIPTION OF THE INVENTION

Embodiments in accordance with the present invention relate to a rotational disc type storage device such as a magnetic disk device, a magnetooptical disk device or the like, and particularly to a rotational disc type storage device having a structure that enhances the mounting precision of a head gimbal assembly.

Embodiments of the present invention provide a rotational disc type storage device having a structure that may enhance the precision of the relative positional relationship between a head gimbal assembly and a rotational disc type recording medium when a head stack assembly is installed into the rotational disc type recording device such as a magnetic disk device or the like.

A principle of embodiments of the present invention resides in that a member for pinching and fixing a head gimbal assembly and a carriage with a nut while the head gimbal assembly and the carriage are laminated is provided with a site for supporting the head gimbal assembly at two places in the cross-section in the radial direction of the flange, thereby fixing the head gimbal assembly under a stable state.

A first mode of embodiments according to the present invention comprises, a rotational disc type recording medium, a head gimbal assembly having a slider to which a head for reading data from the rotational disc type recording medium is coupled and having a first opening formed at the rear end portion thereof, a carriage to which the head gimbal assembly is coupled and that has a second opening, and a pivot member containing a flange that is in contact with a laminate surface of the head gimbal assembly, a support structure for supporting the laminate surface at two places in the cross-section in the radial direction of the flange being formed in the flange, and the pivot member penetrating through the first opening and the second opening, wherein the head gimbal assembly and the carriage that are fitted in the pivot member by a screw action are fixed to the pivot member while the head gimbal assembly and the carriage are stacked.

According to the first mode, the support structure formed in the flange partially supports the two places of the head gimbal assembly, and thus the effect of the parallelism of the flange may be eliminated, and the tilt of the head gimbal assembly along the shape of the support structure may be prevented. Accordingly, the height position of the head gimbal assemblies may be stabilized.

A second mode of embodiments according to the present invention comprises a rotational disc type recording medium, a head gimbal assembly having a slider to which a head for reading data from the rotational disc type recording medium is coupled and having a first opening formed at the rear end portion thereof, a carriage to which a plurality of head gimbal assemblies are coupled in connection with a plurality of respective stacked rotational disc type recording media, a second opening being provided to the carriage, a fixing member having a plane formed by spacing two projecting portions from each other at a fixed interval while the two projecting portions are disposed along the surrounding of the first opening so that the two projecting portions are in partial contact with the laminate surface of the head gimbal assembly provided at the uppermost position with respect to the carriage, a rotational member that is provided with the fixing member at one end thereof and with a screw portion at the other end thereof, and penetrates through the first openings of the plural head gimbal assemblies and the second opening of the carriage, and a nut that is screwed into the screw portion of the rotational member by a screw action and fixes the plural head stack assemblies and the carriage to the rotating member by pinching the plural head stack assemblies and the carriage with the fixing member while the plural head stack assemblies and the carriage are stacked.

According to the second mode, the two projecting portions of the fixing member partially support the two places in the radial direction of the upper most head gimbal assembly coupled to the carriage. Therefore, the effect of parallelism of the plane of the fixing member may be eliminated, and the tilt of the head gimbal assembly along the shape of the supporting means may be prevented. Accordingly, the height position of the head gimbal assembly may be stabilized.

According to embodiments of the present invention, there may be provided a rotational disc type storage device having the structure that may enhance the precision of the relative positional relationship between the head gimbal assembly and the rotational disc type storage medium when the head stack assembly is installed in the rotational disc type storage device such as the magnetic disk device or the like.

Figure 1A:
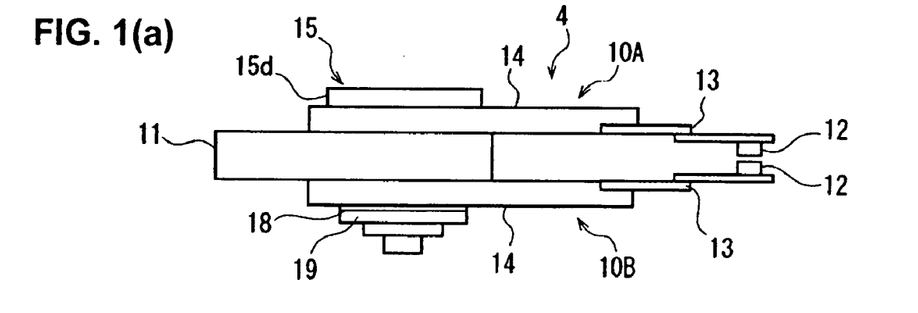
FIGS. 1(A)-1(C) are exemplary diagrams showing a head stack assembly according to a best embodiment of a rotational disc type storage device according to the present invention, (A) is a side view, (B) is a perspective view showing a pivot cartridge, and (C) is a plan view.
Figure 1B:
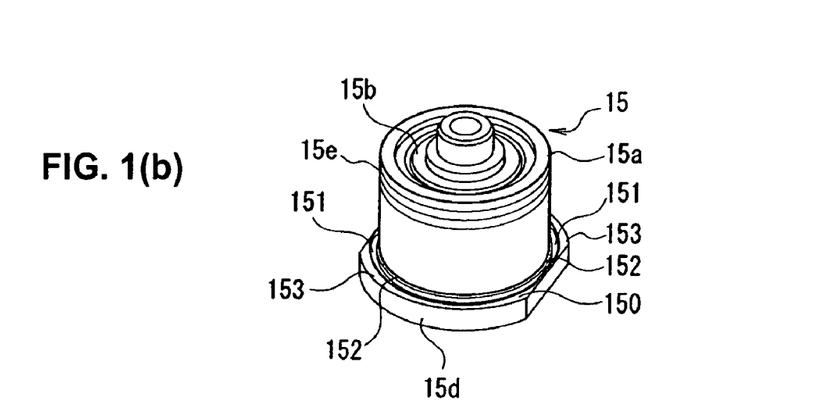
Figure 1C:
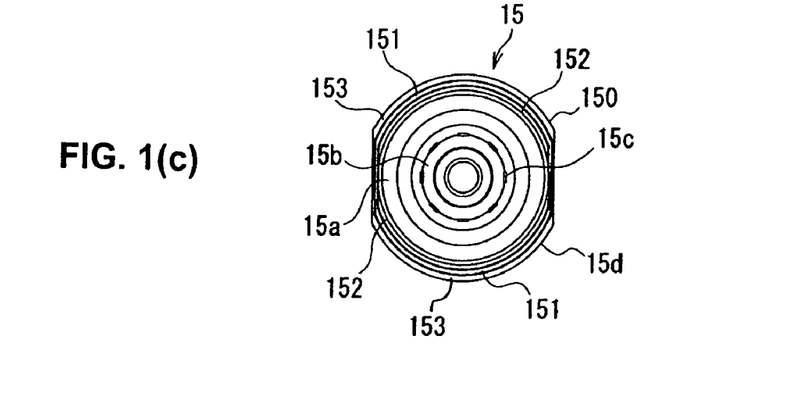
Figure 2:
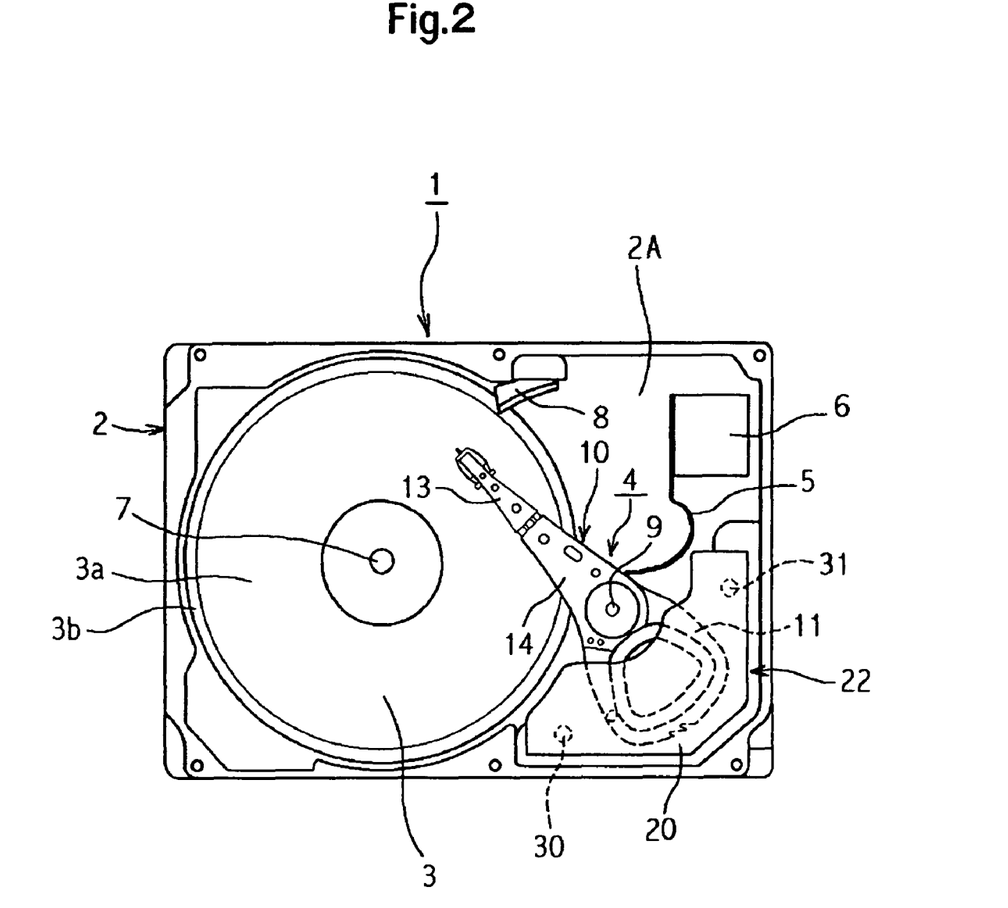
FIG. 2 is an exemplary plan view showing the schematic construction of a magnetic disk device according to the best embodiment of the rotational disc type storage device according to the present invention.
Figure 3:
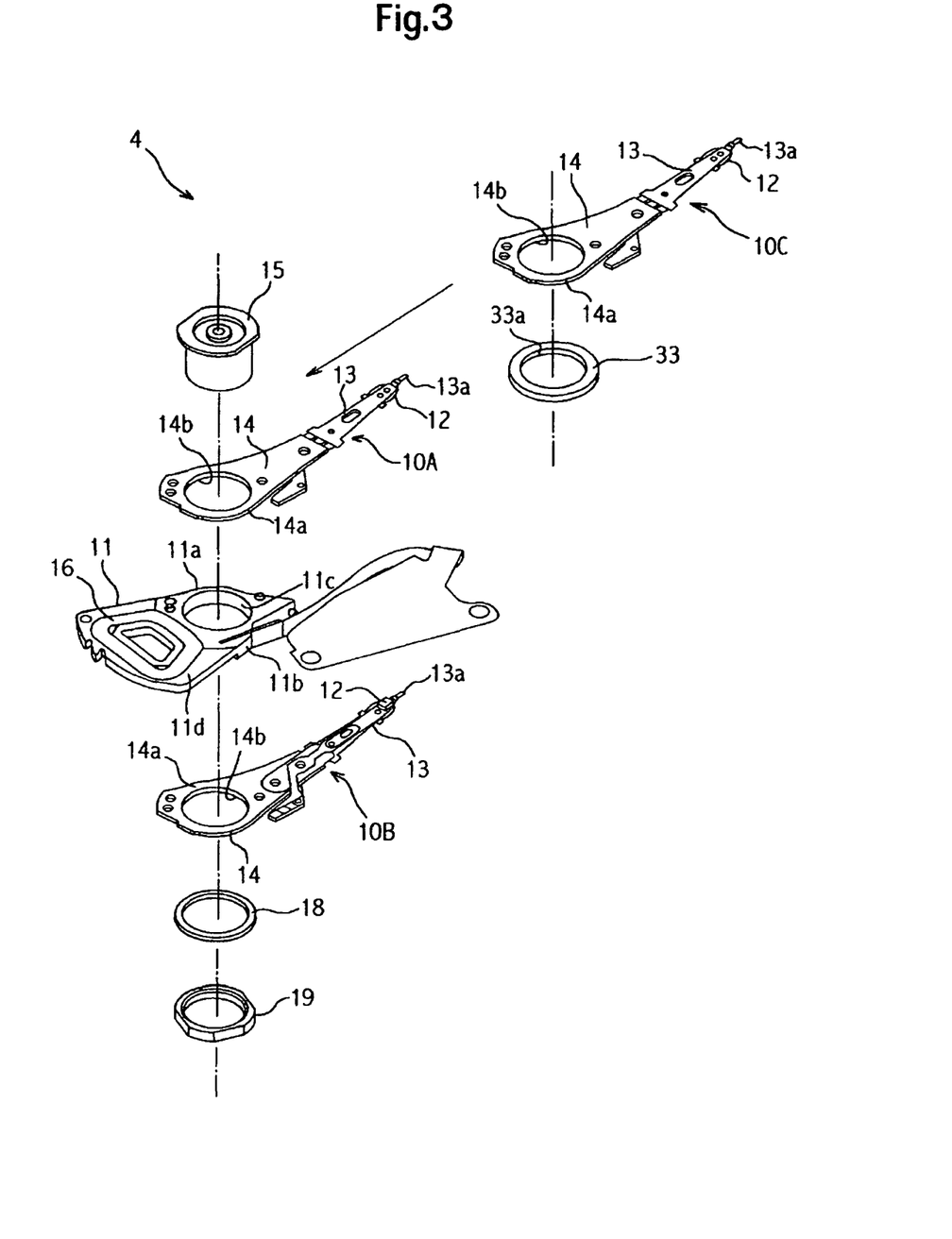
FIG. 3 is an exemplary exploded perspective view showing the structure of a head stack assembly according to the best embodiment of the rotational disc type storage device according to the present invention.
Figure 4A:
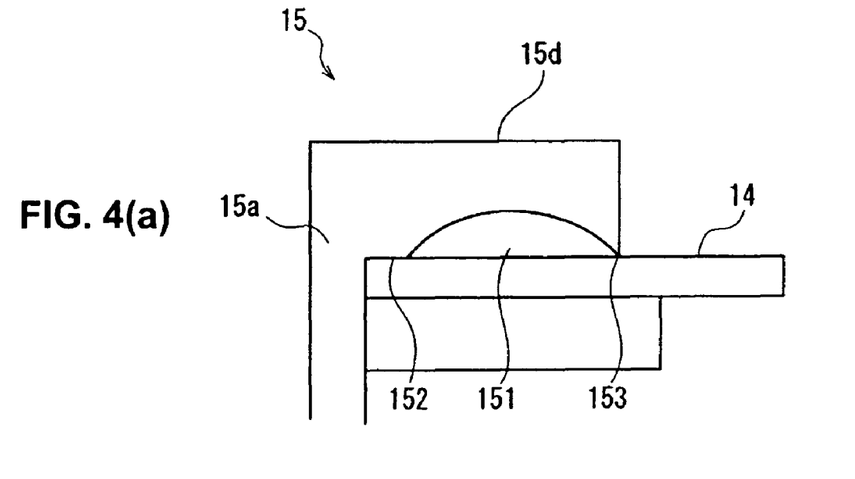
FIGS. 4(A) and 4(B) are exemplary diagrams showing an embodiment of a flange of a pivot cartridge, (A) is a partially cross-sectional view when a recess portion comprises an arcuate groove, and (B) is a partially cross-sectional view when the recess portion comprises a rectangular groove.

Certain modes for carrying out a rotational disc type storage device according to embodiments of the present invention will be described hereunder with reference to the drawings. FIG. 1 is an exemplary diagram showing a head stack assembly as a main portion of a magnetic disk device according to a first embodiment of the present invention, (A) is a side view, (B) is a perspective view of a pivot cartridge, and (C) is a plan view of the pivot cartridge. FIG. 2 is an exemplary plan view showing the schematic construction of the magnetic disk device according to embodiments of the present invention. FIG. 3 is a detailed diagram showing a head stack assembly. FIGS. 4(A), (B) are exemplary partial cross-sectional views showing an embodiment of a flange of a pivot cartridge.

In a magnetic disk device as a rotational disc type storage device according to a mode for carrying out the present invention, as shown in FIG. 2, a disc type magnetic disk 3 as a rotational disc type storage medium, and a head stack assembly 4 are accommodated in a disk enclosure 2 having a space defined by a base 2A and a cover (not shown) for covering the upper portion of the base 2A. A flexible cable 5 and an external connecting terminal 6 mounted on the flexible cable 5 are installed in the base 2A, and the external connecting terminal 6 is connected to a control circuit board (not shown) provided at the outside of the disk enclosure 2.

The magnetic disk 3 has a recording face 3a occupying a major portion at the center for recording data, and a non-recording face 3b unused for data recording in the neighborhood of the outer periphery of the recording face, the recording face 3a and the non-recording face 3b being provided on both the adverse and back surfaces. The magnetic disc 3 as described above is disposed in parallel to the bottom surface of a base 2A and fixed to a rotor portion of a spindle motor (not shown) provided to the base 2A by screws, and it is rotated around the spindle shaft 7 by the spindle motor.

As shown in FIG. 1(A), FIG. 2, FIG. 3, the head stack assembly 4 comprises two head gimbal assemblies 10A, 10B and one carriage 11. The first head gimbal assembly 10A is mounted to the upper fixing face 11a of the carriage 11, and the second head gimbal assembly 10B is mounted to the lower fixing face 11b of the carriage 11. The magnetic disk 3 is disposed between the head gimbal assembly 10A and the head gimbal assembly 10B.

Each of the head gimbal assemblies 10A, 10B comprises a suspension load beam 13 having a tip portion to which the slider 12 is fixed, and a mount plate 14 to which the suspension load beam 13 is linked and fixed.

A magnetic head (not shown) for reading data from the magnetic disk 3 is coupled to the tip of the slider 12 fixed to the tip portion of the suspension load beam 13. The slider 12 to which the magnetic head is coupled is provided to each of the suspension load beams 13 in connection with both the surfaces of the magnetic disk 3. The magnetic head as described above may interactively convert an electrical signal and a magnetic signal to each other, and read/write data from/into the magnetic disk 3. The magnetic head may be comprise only a reading magnetic head that does not write data into a data area 3a of the magnetic disk 3, but reads out a recorded magnetic signal and converts it to an electrical signal to reproduce information. Furthermore, the slider 12 has an air bearing (ABS) surface formed on the bottom surface thereof, and air flows occurring at the surface of the rotating magnetic disk 3 impinges against the air bearing surface, whereby buoyant force is applied to the slider 12. Accordingly, the slider flies from the surface of the magnetic disk with keeping a slight gap and located at a predetermined position. As described above, the positional relationship between the recording face of the magnetic disk 3 and the head gimbal assembly 10A, 10B on which the slider 12 is mounted is required to be rigorously managed, however, the head gimbal assemblies 10A, 10B are supported as constituent elements separate from the base 2A, so that each head gimbal assembly is manufactured and assembled within the tolerance range thereof.

Furthermore, the suspension load beam 13 is provided while a tab 13a projects from the tip portion thereof, and the tab 13a is held by a ramp 8 (see FIG. 2) which is coupled to in the neighborhood of the outside of the magnetic disk 3 on the base 2A. The ramp 8 is a constituent element used in a load/unload system which is one technique for supplying an evacuation place on the slider 12 when the rotation of the magnetic disk 3 is stopped, and it is disclosed in Japanese Patent Publication No. 10-302421, for example.

A fixing portion 14a is provided at the rear end portion of the mount plate 14, and it has a pivot opening 14b in which a pivot cartridge 15 as a pivot member for rotation around the pivot shaft 9 (see FIG. 2) is inserted.

A pivot opening 11c in which the pivot cartridge 15 is inserted is formed at the front portion of the carriage 11, and a coil support 11d for holding a voice coil 16 is formed at the rear portion of the carriage 11. Furthermore, the voice coil 16 is disposed in the space between upper and lower yokes 20, and a voice coil magnet (not shown) comprising permanent magnet is coupled to the inside of each of the upper and lower yokes 20 to form a magnetic space 22 (see FIG. 2).

The coil support 11d, the voice coil 16, the voice coil magnet, and the upper and lower yokes 20 constitute a voice coil motor. Even when a permanent magnet exists inside only one of the yokes, the voice coil motor may be constructed.

Furthermore, the lower yoke of the upper and lower yokes 20 is adhesively attached to the base 2A, and a pole (not shown) for supporting the upper yoke is provided to the end portion of the lower yoke.

Current flows to the voice coil 16 held by the coil support 11d so that the head stack assembly 4 is forwardly and backwardly rotated with the pivot cartridge 15 set as the rotational center. The magnitude and direction of the current flowing in the voice coil 16 are controlled by a control circuit board, whereby the head stack assembly 4 may be driven and the sliders 12 may be located at predetermined positions.

In the magnetic disk device 1, the head stack assembly 4 is moved to the outside of the magnetic disk 3 before the rotation of the magnetic disk 3 is stopped, and further the sliders 12 are evacuated to a slope section of the ramp 8 while the tab 13a is slid against the ramp 8.

When the head stack assembly 4 is turned to a predetermined position and reaches the slope section of the ramp 8, the two sliders 12, 12 are held so as to keep a fixed gap therebetween, and thus the sliders 12, 12 are prevented from coming into contact with each other even when such impact force that the two sliders 12, 12 are vertically accelerated is applied to the magnetic disk device 1.

In order to restrict the excessively inward or outward movement of the head stack assembly 4, an outside crash stop member 30 and an inside crash stop member 31 which are formed of rubber for restricting the turn range of the carriage 11 are provided in the base 2A.

The head stack assembly 4 as the main part of the magnetic disk device 1 as described above is fixed by the pivot cartridge 15, a spring washer 18 and a nut 19 while the head gimbal assembly 10A, the carriage 11 and the head gimbal assembly 10B are laminated in this order. The spring washer 18 is interposed between the head gimbal assembly 10B and the nut 19 to prevent the nut 19 from slacking.

The pivot cartridge 15 has a rolling ball bearing structure in which an outer wheel 15a and an inner wheel 15b are provided and plural balls 15c are provided between both the wheels as shown in FIGS. 1(B)-(C). A flange 15d is formed at one end of the outer wheel 15a, and a spring portion 15e is formed at the other end of the outer wheel 15a. As shown in FIG. 1(A), FIG. 3, the pivot cartridge 15 is engagedly fitted in the openings 14b, 11c and 14b of the head gimbal assembly 10A, the carriage 11 and the head gimbal assembly 10B in this order. Accordingly, the flange 15d is in contact with the mount plate 14 of the assembly 10A, and the spring washer 18 is in contact with the mount plate 14 of the head gimbal assembly 10B. The openings 14b, 11c and 14b are formed so as to have the same inside diameter. The openings 14b, 11c and 14b are clearance-fitted to prevent disability of insertion of the pivot cartridge 15 due to production tolerance.

The pivot cartridge 15 as described above is preferably formed of stainless steel from the viewpoint of corrosion resistance and abrasion. However, the planarization processing of the surface of the flange 15d which is brought into contact with the mount plate serving as a laminate face of the head gimbal assembly 10A is a lathe turning processing. Therefore, in the case of stainless steel, scratches, etc. are liable to occur due to processing blades and thus unevenness is liable to appear on the surface of the flange 15d. Accordingly, even if parallelism of the upper fixing face 11a of the carriage 11 is achieved, the head gimbal assembly 10A is slightly warped and thus easily inclined when the head gimbal assembly 10A is coupled to the carriage 11 and clinched by the pivot cartridge 15, the spring washer 18 and the nut 19. Furthermore, the unevenness does not necessarily appear at the same position of the surface of the flange 15d, and thus the height position of the head gimbal assembly 10A may be dispersed.

Therefore, the contact side 150 of the flange 15d is designed so that a recess portion 151 is formed to partially support two places of the mount plate 14 in the cross-section in the radial direction of the flange 15d. The recess portion 151 is designed in an annular shape having a length in the radial direction of the flange 15d. By partially supporting the two places of the mount plate 14 in the cross-section in the radial direction of the flange 15d, the influence of the unevenness appearing at the contact side 150 of the flange 15d may be reduced. Furthermore, the difference between the highest and lowest sites of the contact side 150 of the flange 15d is preferably equal to 5 μm or more. The lower limit of the height difference is set to 5 μm or more in consideration of the processing roughness of the contact side 150 of the flange 15d. The upper limit of the height difference is determined in accordance with the thickness of the flange 15d. That is, the depth of the recess portion 151 is set so as to keep the strength of the flange 15d.

The recess portion 151 is formed by separating two projecting portions 152, 153 provided to the contact side 150 of the flange 15d from each other at a fixed interval. The projecting portion 152 is formed along the outer periphery of the outer wheel 15a, and the projecting portion 153 is formed on the further outer periphery of the projecting portion 152. Accordingly, the projecting portions 152, 153 may partially support the two places of the surrounding of the opening 14b of the mount plate 14 of the head gimbal assembly 10A and the outer periphery thereof in the cross-section in the radial direction of the flange 15d. Therefore, the effect of the parallelism of the contact side 150 of the flange 15d may be eliminated, and also the head gimbal assembly may be prevented from being inclined along the shape of the support structure. In FIG. 3, the flange 15d of the pivot cartridge 15 is provided with two notches in which a spanner is fitted to fix the nut 19 to the pivot cartridge 15 by a screw. The flange 15d is provided with two areas of arcuate recess portions 151 having a predetermined length in the radial direction because the two notches are provided to the flange 15d. These two areas are disposed so as to face each other in the pitch direction of the head gimbal assembly 10A with the opening 14b at the center therebetween.

Figure 4B:
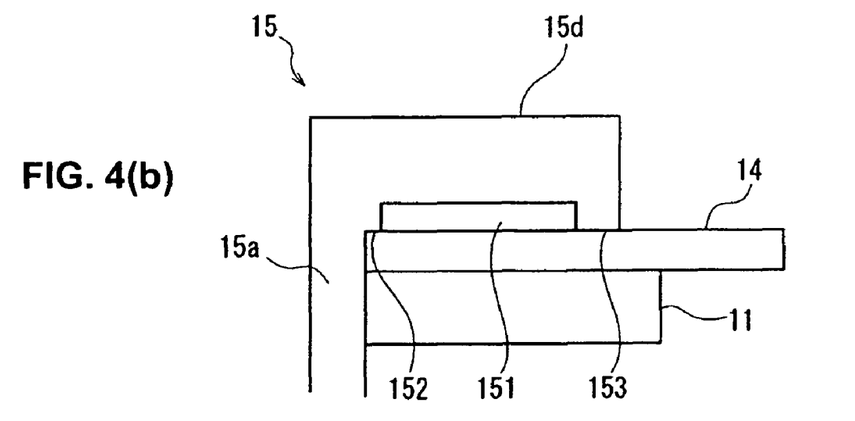

In the cross-section in the radial direction of the flange 15d, the recess portion 151 may be constructed between the projecting portion 152 and the projecting portion 153 by an arcuate groove. At this time, in the projecting portion 152, a site which is in contact with the mount plate 14 of the head gimbal assembly 10B may be set to a plane. By setting the contact site of the projecting portion 152 to a plane, the position of the mount plate 14 of the head gimbal assembly 10B whose fitting is clearance-fitting is displaced within the range of the gap, the two places of the mount plate 14 in the cross-section in the radial direction of the flange 15d may be partially supported by the projecting portions 152, 153. At this time, the projecting portion 153 is formed so that the tip portion thereof has an acute angle. However, the present invention is not limited to this embodiment, and as in the case of the projecting portion 152, a site which is in contact with the mount plate 14 of the head gimbal assembly 10B may be set to a plane as shown in FIG. 4(B), and any shape may be adopted insofar as the two places of the mount plate 14 may be partially supported by the projecting portions 152, 153 with no tilt of the mount plate 14 concerned. In FIG. 4(B), the recess portion 151 is constructed by a rectangular groove between the projecting portion 152 and the projecting portion 153, however, it may be constructed by an arcuate groove as shown in FIG. 4(A).

In order to assemble the magnetic disk device 1 as described above, the spindle motor is installed into the base 2A with which the spindle shaft 7, etc. are integrally formed, and the magnetic disk 3 is fixed to the rotor portion of the spindle motor by a screw. Furthermore, the lower yoke to which the voice coil magnet is coupled is adhesively attached to the base 2A.

The pivot cartridge 15 is mounted to the head gimbal assembly 10A, the carriage 11 and the head gimbal assembly 10B, and fixed to them by the spring washer 18 and the nut 19 to assemble the head stack assembly 4. The head stack assembly 4 is engagedly fitted to the pivot shaft 9 by the pivot cartridge 15, the carriage 11 is moved around the pivot shaft 9 and the magnetic heads coupled to the sliders 12 are moved to the magnetic disk 3. A magnetic head side end portion of an FPC cable (not shown) is mounted on the side surface of the head stack assembly 4, and a head wire from the magnetic head and a coil wire from the voice coil 16 of the carriage 11 are connected to the magnetic head side end portion. An opposite-side end portion of the FPC cable is connected to the external connecting terminal 6 through a connector by the flexible cable 5.

Finally, the upper and lower yokes 20 are fixed to the predetermined positions.

As described above, after the magnetic disk 3 and the head stack assembly 4 are installed, the outside crash stop member 30 and the inside crash stop member 31 are disposed, and the lid of the base 2A is coupled to, thereby completing the fabrication.

Next, the operation of the magnetic disk device 1 as described above will be described.

Under the operation stop state, the tabs 13a of the suspension load beams 13 are located in the slope section of the ramp 8. At this time, when the magnetic disk device 1 is actuated, the spindle motor is driven to rotate the magnetic disk 3. Therefore, when the voice coil 16 is driven to rotate the head stack assembly 4 toward the magnetic disk, the tabs 13a are separated from the ramp 8 while sliding against the sliding surface of the ramp 8. At this time, the sliders 12 move to the surfaces of the magnetic disk, and air flow occurring due to the rotation of the magnetic disk 3 flows into the gap between the magnetic disk 3 and each slider 12 to form an air bearing. Therefore, the sliders 12 are floated by using the thus-formed air bearing. At this time, the circular recess portion 151 is formed along the planar shape of the flange 15d at the contact side 150 of the flange 15d. Therefore, in the cross-section in the radial direction of the flange 15d, the two places of the surrounding of the opening 14b of the mount plate 14 of the head gimbal assembly 10A and the outer periphery thereof may be partially supported. Accordingly, the effect of the parallelism of the contact side 150 of the flange 15d may be eliminated, and also the head gimbal assembly 10A may be prevented from being inclined along the shape of the support structure of the contact side 150 of the flange 15d. Therefore, the parallelism of the head gimbal assemblies 10A, 10B, particularly, the parallelism in the pitch direction may be maintained.

In order to stop the operation, the voice coil motor is driven to rotate the head stack assembly 4 toward the ramp until the head stack assembly 4 reaches the slope section of the ramp 8.

The height positions of the head gimbal assemblies of the head stack assembly used for the thus-constructed magnetic disk device according to the present embodiment and the head stack assembly used for the conventional magnetic disk device were measured for comparison.

As the head stack assemblies used for this measurement were used head stack assemblies used for a 1-type magnetic disk device in which a magnetic disk was disposed between two head gimbal assemblies. In a conventional head stack assembly 400 shown in FIG. 6, the contact surface of a flange 403 of a pivot cartridge 402 was subjected to no processing, however, the end portion of the flange 403 was subjected to chamfering.

Figure 5:
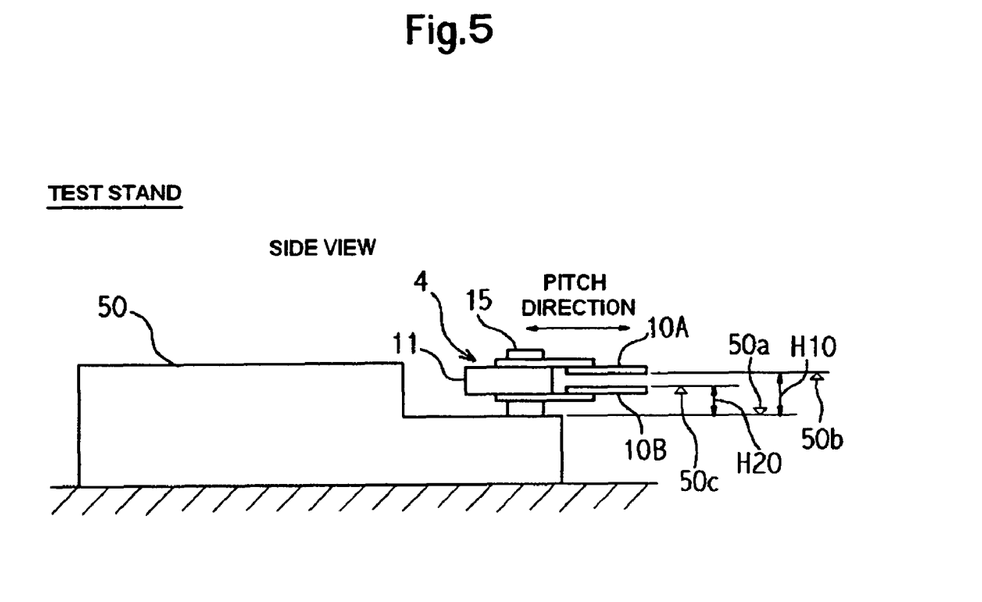
FIG. 5 is an exemplary diagram showing a test stand for testing the fixing precision of the head gimbal assembly to the pivot cartridge.

A measuring device is a test stand 50 for three-dimensional dimension measurement as shown in FIG. 5. The test stand 50 is adjusted in level so that the axial direction of the pivot cartridge 15 of the head stack assembly 4 is set to the vertical direction. After the head stack assembly 4 is set up on the test stand 50, the dimension H10, H20 between the reference plane 50a of the test stand 50 and each of plural measurement points 50b, 50c required to check the parallelism of each of the head gimbal assemblies 10A, 10B of the head stack assembly 4 was measured to check the parallelism in the pitch direction of each of the head gimbal assemblies 10A, 10B. A laser measuring device was used as a measuring instrument.

Figure 6:
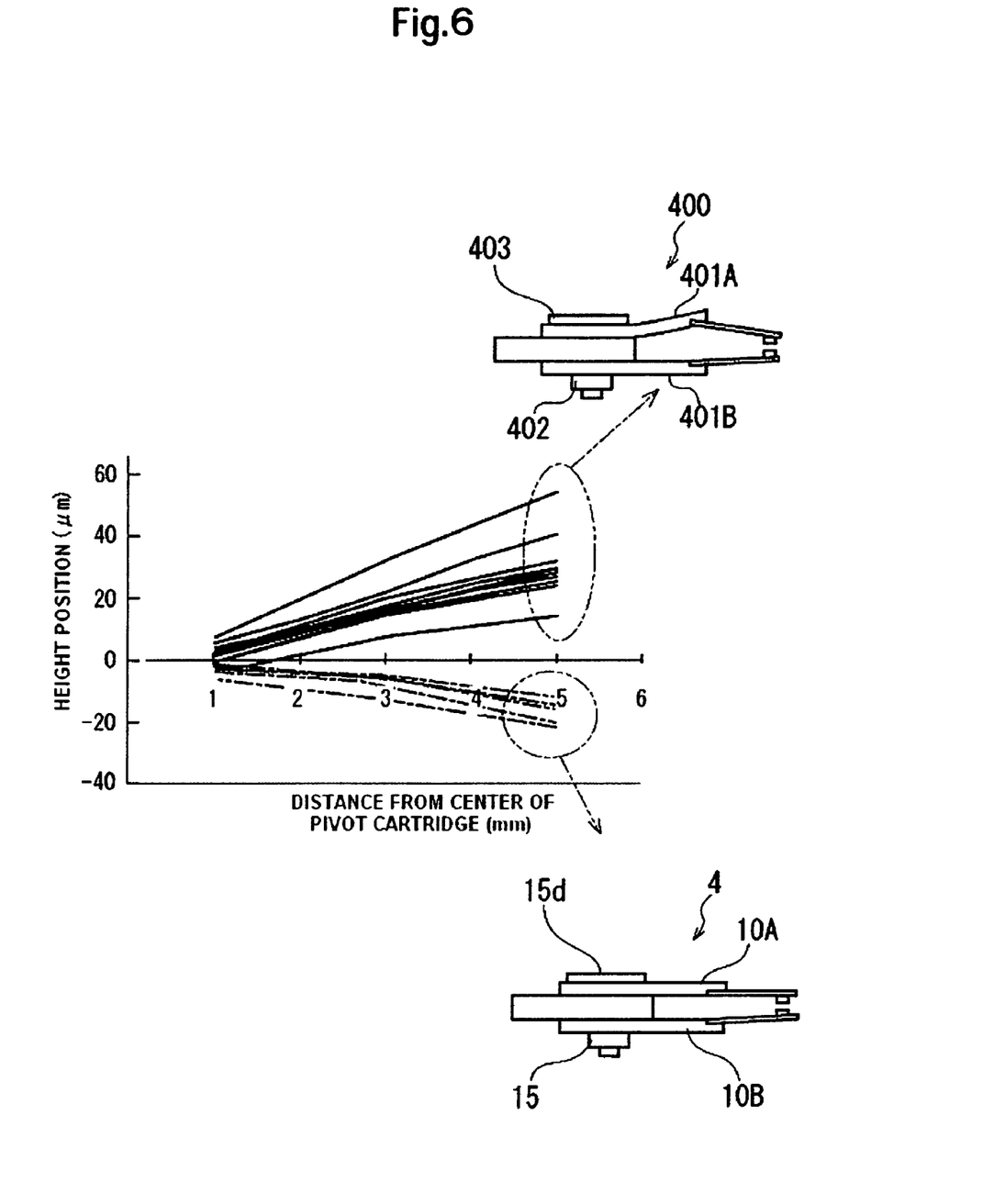
FIG. 6 is an exemplary diagram showing a measurement result of the invention.
Figure 7A:
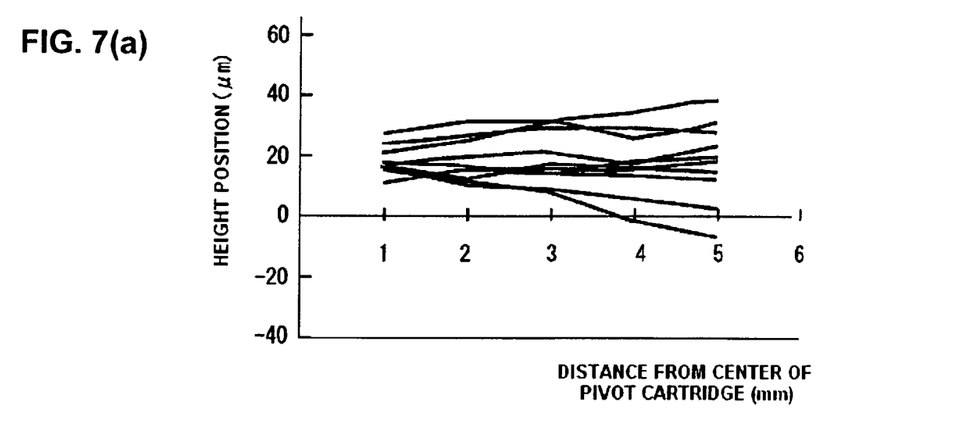
FIGS. 7(A) and 7(B) are exemplary diagrams showing another measurement result according to embodiments of the invention.
Figure 7B:
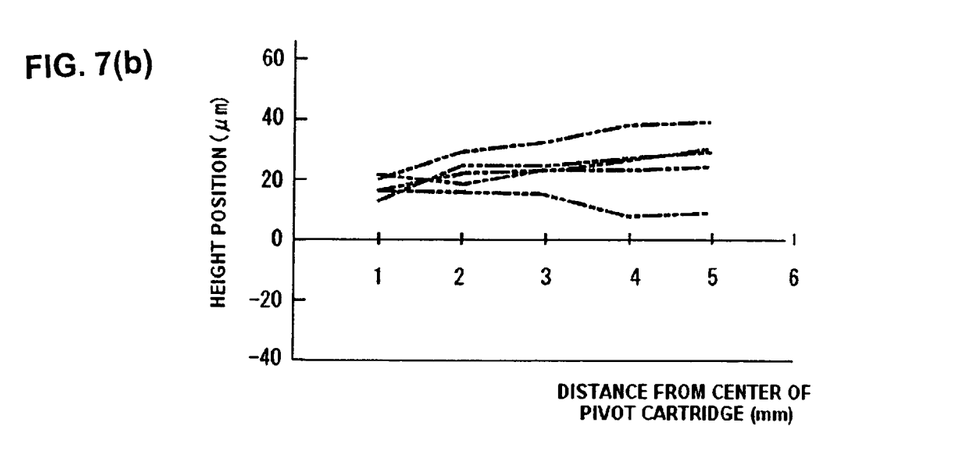

FIG. 6, and FIGS. 7(A) and 7(B) show the height position of the head gimbal assembly. The abscissa axis represents the distance (mm) from the rotational center of the pivot cartridge in the pitch direction of the head gimbal assembly, and the ordinate axis represents the height position (μm) of the head gimbal assembly. The zero point of the ordinate axis represents a nominal value. 10 sets were measured for the conventional head stack assembly 400, and 5 sets were measured for the head stack assembly 4 of the present embodiment.

A graph shown in FIG. 6 is a measurement result of the head gimbal assembly located above the magnetic disk. Comparing this measurement result, it has been confirmed that the head gimbal assembly 10A of the head stack assembly 4 according to this embodiment may suppress the dispersion of the height position more remarkably than the head gimbal assembly 401A of the conventional head stack assembly 400 by partially supporting the two places of the surrounding of the opening 14b of the mount plate 14 of the head gimbal assembly 10A and the outer periphery thereof in the cross-section in the radial direction of the flange 15d by the projecting portions 152, 153 formed on the flange 15d of the pivot cartridge 15. Furthermore, the head gimbal assembly 10A of the head stack assembly 4 of the present embodiment may be prevented from being tilted along the shape of the support structure by the two-point supporting of the projecting portions 152, 153 of the flange 15d of the pivot cartridge 15. Accordingly, the tilt of the head gimbal assembly 10A may be reduced over the longitudinal direction of the head gimbal assembly 10A of the present embodiment, and thus it has been also found in the graph shown in FIG. 6 that the displacement of the height position in the head gimbal assembly 10A of the present embodiment is smaller than the conventional head gimbal assembly 401A because the measurement points are totally nearer to the nominal value.

Furthermore, in the graph of FIG. 6, the height position of the conventional head gimbal assembly 401A concentrates on the plus direction because the lathe turning processing of the contact face of the flange 403 of the pivot cartridge 402 on which the head gimbal assembly 401A is laminated is more easily performed in the direction concerned. On the other hand, the height position of the head gimbal assembly 10A of the present embodiment concentrates on the minus direction conversely to the conventional head gimbal assembly 401A because the projecting portion 153 formed on the flange 15d of the pivot cartridge 15 projects more than the projecting portion 152. When the projecting portion is formed in a circular shape at one place along the planar shape of the flange 403 on the contact face of the flange 403 of the pivot cartridge 402 used in the conventional head stack assembly 400, the head gimbal assembly 401A cannot be stably supported. Accordingly, the height position of the head gimbal assembly 401A is dispersed or the displacement of the height position is remarkable.

A graph of FIG. 7(A) shows a measurement result of the head gimbal assembly 401B located at the lower side of the magnetic disk of the conventional head stack assembly 400 shown in FIG. 6. A graph of FIG. 7(B) is a measurement result of the head gimbal assembly 10B located at the lower side of the magnetic disk of the head stack assembly 4 of the present embodiment shown in FIG. 6. Comparing these measurement results, as in the case of the measurement result of FIG. 6, it has been confirmed that the head gimbal assembly 10B of the head stack assembly 4 of the present embodiment may more greatly suppress the dispersion of the height position than the head gimbal assembly 401B of the conventional head stack assembly 400 by partially supporting the two places of the surrounding of the opening 14b of the mount plate 14 of the head gimbal assembly 10B and the outer periphery thereof in the cross-section in the radial direction of the flange 15d by the projecting portions 152, 153 formed on the flange 15d of the pivot cartridge 15. Furthermore, the head gimbal assembly 10B of the head stack assembly 4 of the present embodiment may be prevented from being tilted along the shape of the support structure by the two-point supporting of the projecting portions 152, 153 of the flange 15d of the pivot cartridge 15. Accordingly, the tilt of the head gimbal assembly 10B may be reduced over the longitudinal direction of the head gimbal assembly 10B of the present embodiment, and thus it has been also found in the graph shown in FIGS. 7(A) and 7(B) that the displacement of the height position in the head gimbal assembly 10B of the present embodiment is smaller than the conventional head gimbal assembly 401B because the measurement points are totally nearer to the nominal value. The difference of the measurement results of FIGS. 7(A) and 7(B) is smaller as compared with FIG. 6 because the carriage is formed of plastic resin. That is, the lower head gimbal assembly is stacked on the upper head gimbal assembly through the plastic resin carriage, and fixed to the pivot cartridge, and thus the dispersion of the height position of the head gimbal assembly disposed at the lower side is embedded in the dispersion of the contraction percentage of plastic resin.

In the magnetic disk device 1 according to an embodiment for carrying out the invention described above, the flange 15d is formed in the pivot cartridge 15, however, the present invention is not limited to this embodiment. The flange 15d may be detachably fixed to the pivot cartridge 15.

In the magnetic disk device 1 according to a mode for carrying out the invention described above, the two head gimbal assemblies are mounted on one carriage in the head stack assembly. However, the present invention is not limited to this embodiment. One head gimbal assembly may be coupled to only one fixing face of the carriage, or another head gimbal assembly 10C may be laminated through a spacer 33 on the head gimbal assembly 10A mounted on the carriage 11 as shown in FIG. 3. Accordingly, plural head gimbal assemblies and spacers may be alternately stacked on the fixing face of the carriage, and thus the present invention may be adapted to a magnetic disk device in which plural magnetic disks are stacked. However, the greatest effect according to embodiments of the present invention may be achieved by the magnetic disk device 1 including one magnetic disk 3 described above.

In the head stack assembly 4 of the above-described embodiment, the nut 19 is used because the head gimbal assembly 10A, the carriage 11 and the head gimbal assembly 10B are fixed to the pivot cartridge 15 while the head gimbal assembly 10A, the carriage 11 and the head gimbal assembly 10B are stacked. However, the present invention is not limited to this embodiment, and they may be fixed by using an adhesive agent. Furthermore, a female screw hole is formed from the side surface of the carriage 11 so as to extend to the pivot opening 11c, and a locking screw such as a hexagon socket locking screw or a slotted locking screw is screwed into the female screw hole to fix the head gimbal assembly 10A, the carriage 11 and the head gimbal assembly 10B to the pivot cartridge 15 while the head gimbal assembly 10A, the carriage 11 and the head gimbal assembly 10B are stacked.

The above-described embodiment has been described by using the load/unload type magnetic disk device, however, the present invention is not limited to this embodiment. The present invention may be applied to a CSS (Contact Start Stop) type magnetic disk device in which the magnetic disk has an evacuation area, and the head stack assembly evacuates a slider having a magnetic head coupled thereto to the evacuation area through a head gimbal assembly.

The present invention has been described by using the specific embodiment shown in the figures. However, it is needless to say that the present invention is not limited to these embodiments shown in the drawings, and any well-known construction may be adopted insofar as the effect of the present invention may be achieved.

What is claimed is:

1. A rotational disc type storage device comprising:
a rotational disc type recording medium;
a head gimbal assembly having a slider to which a head for reading data from the rotational disc type recording medium is coupled and having a first opening formed at a rear end portion thereof;
a carriage to which the head gimbal assembly is coupled and that has a second opening;
a pivot member containing a flange that is in contact with a laminate surface of the head gimbal assembly;
a support structure for supporting the laminate surface at two places in a cross-section in a radial direction of the flange formed in the flange, the pivot member penetrating through the first opening and the second opening, wherein the support structure is formed by a recess portion provided to a contact side of the flange, and wherein the recess portion is formed by disposing two projecting portions provided from the contact side of the flange so that the two projecting portions are spaced from each other at a fixed interval,
wherein the head gimbal assembly and the carriage that are fitted in the pivot member are fixed to the pivot member while the head gimbal assembly and the carriage are stacked.

2. The rotational disc type storage device according to claim 1, wherein one of the projecting portions is formed along the outer periphery of the pivot member, and the other projecting portion is formed on the further outer periphery of the one projecting portion.

3. The rotational disc type storage according to claim 2, wherein the gap between the one projecting portion and the other projecting portion is arcuate in the cross-section in the radial direction of the flange.

4. The rotational disc type storage device according to claim 2, wherein with respect to the one projecting portion, a site which is in contact with the laminate surface is planar.

5. The rotational disc type storage device according to claim 4, wherein the insertion and fitting of the pivot member in the opening is based on clearance-fitting.

6. The rotational disc type storage device according to claim 1, wherein a height difference between the highest and lowest sites at the contact side of the flange is set to 5 μm or more.

7. The rotational disc type storage device according to claim 1, wherein the pivot member is formed of stainless steel.

8. The rotational disc type storage device according to claim 1, wherein the head gimbal assembly and the carriage are fixed to the pivot member through a spring washer by a nut.

9. A rotational disc type storage device comprising:
a rotational disc type recording medium;
a head gimbal assembly having a slider to which a head for reading data from the rotational disc type recording medium is coupled and having a first opening formed at a rear end portion thereof;
a carriage to which a plurality of head gimbal assemblies are coupled in connection with a plurality of respective stacked rotational disc type recording media, a second opening being provided to the carriage;
a fixing member having a plane formed by spacing two projecting portions from each other at a fixed interval while the two projecting portions are disposed along the surrounding of the first opening so that a portion of two projecting portions are in contact with a laminate surface of the head gimbal assembly provided at an uppermost position with respect to the carriage, wherein the fixing member is provided to the contact side of a flange;
a rotational member that is provided with the fixing member at one end thereof and with a screw portion at the other end thereof, and penetrates through the first openings of the plural head gimbal assemblies and the second opening of the carriage, the rotational member containing the flange, wherein the flange is in contact with the laminate surface of the head gimbal assembly; and
a nut that is screwed into the screw portion of the rotational member by a screw action and fixes the plural head stack assemblies and the carriage to the rotating member by pinching the plural head stack assemblies and the carriage with the fixing member while the plural head stack assemblies and the carriage are stacked.

* * * * *